April 29, 1969 R. C. PAINTON ET AL 3,441,761
IRONLESS ROTOR FOR ELECTRIC MOTOR
Filed July 25, 1966

RICHARD C. PAINTON
CLARENCE A. BURKE
INVENTORS

BY *Daniel E. Sagan*

*Robert W. Hampton*

ATTORNEYS

United States Patent Office 3,441,761
Patented Apr. 29, 1969

3,441,761
IRONLESS ROTOR FOR ELECTRIC MOTOR
Richard Clarence Painton and Clarence Albert Burke, Rochester, N.Y., assignors to Eastman Kodak Company, Rochester, N.Y., a corporation of New Jersey
Filed July 25, 1966, Ser. No. 567,671
Int. Cl. H02k 23/56, 15/04
U.S. Cl. 310—154        7 Claims

ABSTRACT OF THE DISCLOSURE

An ironless rotor is made by winding a length of wire about a form, separating the winding from the form, flattening the length of wire into a flat strip, and joining the ends of that flat strip of wire to form a hollow cylindrical rotor. Stationary ferromagnetic materials are positioned both inside and outside the ironless rotor to create magnetic flux paths. The ironless rotor is the only part of the electric motor which is movable relative to the motor frame.

---

This invention relates generally to self-supporting rotors for electric motors and to a method for making self-supported rotor windings.

Rotors frequently comprise a plurality of wire windings around the surface of a solid or laminated iron core. Various methods of winding have been employed, for instance placing each winding conductor into the proper slot in a prepared core. Other methods include the use of shaping dies to force windings around metallic formers or supports.

While an iron core adds to the flux shaping characteristics of the rotor and adds to its structural stability, the iron core causes losses such as hysteresis and eddy currents which give no operational benefit and only heat the core. Furthermore, the inertia of a rotating core causes slow response upon acceleration or deceleration. It has therefore been desired to produce a rotor which has no rotating iron and therefore little or no hysteresis and eddy current loss, and has low inertial characteristics, and which is relatively inexpensive to manufacture.

An object of this invention therefore is to provide a relatively inexpensive lightweight rotor for electric motors, and in particular for direct current motors.

A further object of this invention is to provide a rotor having no moving iron core and yet which is sufficiently self-supporting as to be structurally stable.

A further object of this invention is to provide a rotor which, in conjunction with the other elements of a motor, contributes a minimum of power loss and responds rapidly to changes in energization.

Another object of the invention is to provide a novel method of making a rotor, which greatly reduces the cost of manufacture thereof.

These objects have been attained according to the present invention by providing a rotor which has virtually no iron and is structurally stable to a sufficient degree to be self supporting. According to the present invention, all of the iron in the magnetic path of the motor is made stationary so that it does not add to the inertia of the rotating mass. This is accomplished by having stationary ferromagnetic material both inside and outside the rotor. Either the material inside the rotor or outside the rotor or both may be magnetized. If the stationary material outside the rotor is magnetized, an additional ferromagnetic annulus must be provided around the outer magnetized iron in order to complete the magnetic path. The rotor contemplated in the invention is of lap wound, hexagonal loop construction.

Other objects and advantages will become apparent in the following description relating to the appended drawings of which:

FIGURES 1–4, in addition to showing the basic structure of the invention, represent in consecutive order the steps of construction and assembly thereof.

Figure 1:
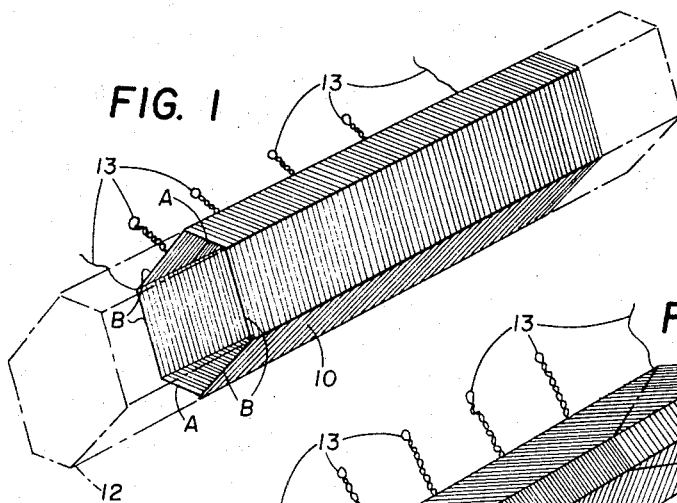
FIGURE 1 is a perspective view of a hexagonal winding used to construct a preferred embodiment of the invention.

FIGURE 1 shows a winding 10 wound onto a hexagonal form 12. The wire used in making winding 10 has an insulating and bondable coating. Leads 13 are connected to winding 10 so as to divide winding 10 into substantially equal sections. Hexagonal form 12 is preferably so constructed that sides A of the winding 10 are of smaller width than sides B as illustrated. Consequently, winding 10 is hexahedron-shaped.

Figure 2:
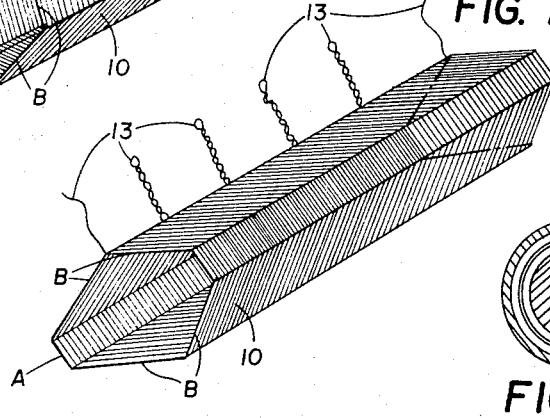
FIGURE 2 is a perspective view of the winding of FIG. 1 after it has been flattened.

The second step in formation of a rotor winding is separating winding 10 from form 12 and flattening winding 10 as illustrated in FIGURE 2. Winding 10 is flattened so that the two sides A of winding 10 are abutting each other, thereby forming a substantially flat, essentially two-dimensional strip of adjacent hexagonal loops.

Figure 3:
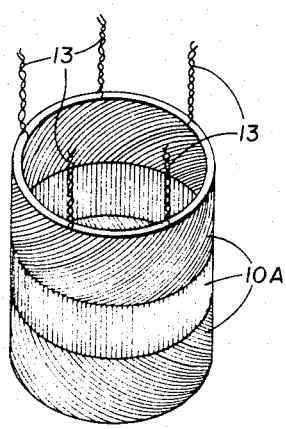
FIGURE 3 is a perspective view of a completed winding prior to assembly.

FIGURE 3 represents the winding of FIGURE 2 rolled into the form of a hollow cylinder 10A. Any suitable cylindrical form may be used which does not damage the insulation of the wire and which has a circumference such that the two ends of the flattened strip shown in FIGURE 2 can be overlapped providing a substantially uniform thickness of two layers of wire throughout the hollow cylinder 10A. Fastening the lapped ends together by epoxy or by any means which does not electrically short the windings, and bonding the individual turns to each other, produces a lightweight cylindrical winding.

Figure 4:
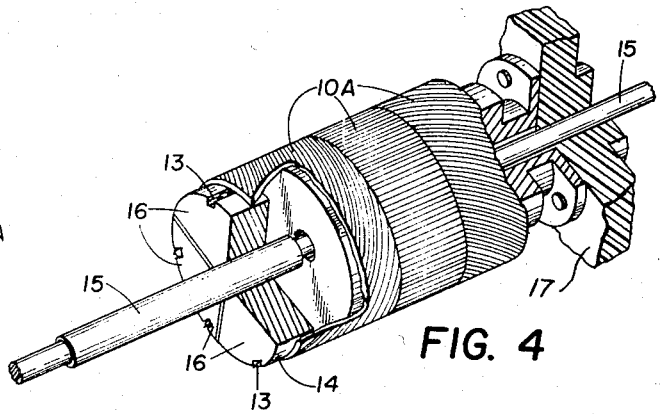
FIGURE 4 is a perspective view of the completed rotor.

FIGURE 4 shows the completed rotor. One end of the cylinder 10A is rigidly attached to a cylindrical winding support 14 which extends into the winding only a short distance. Support 14 is of a lightweight electrically insulating material and has mounted at one end thereof commutator segments 16 to which the leads 13 from winding 10A are attached by suitable means such as soldering or welding. Winding support 14 is fixed to shaft 15. Commutator segments 16 are electrically isolated in any known manner. Ferromagnetic material 20 is positioned concentrically about shaft 15 and is attached to motor frame 17 in such a manner that air gaps exist between shaft 15 and ferromagnetic material 20, between ferromagnetic material 20 and rotor winding 10A, and between ferromagnetic material 20 and support 14. Because no movable iron core is necessary to provide physical stability of the rotor, inertial losses are minimized.

Figure 5:
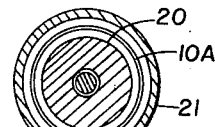
FIGURE 5 is a view in cross section of one arrangement in which the rotor can be used in a motor.

FIGURE 5 is a cross-sectional view taken transverse to the axis of shaft 15 of FIGURE 4 and shows an embodiment of a completed motor according to the present invention. Ferromagnetic material 20, a magnet in this embodiment, is attached to the frame of motor 17 by any known means. Surrounding magnet 20 is winding 10A. Surrounding winding 10A is an iron annulus 21 which serves to complete the magnetic path.

Figure 6:
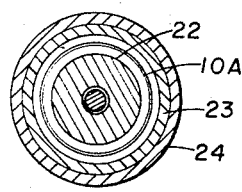
FIGURE 6 is a cross sectional view of an alternative arrangement of a motor using a rotor according to the invention.

FIGURE 6 is a cross-sectional view taken transverse to the axis of shaft 15 of FIGURE 4 and shows another embodiment of a completed motor according to the present invention. Ferromagnetic material 22, a magnet in this embodiment, is rigidly attached to the frame of motor 17 by any known means. Surrounding magnet 22 is winding 10A. Surrounding winding 10A and spaced therefrom is annular magnet 23. Surrounding magnet 23 and in abutting relationship therewith is an annular iron ring 24 which serves to complete the magnetic path of magnet 23.

In addition to providing much lower inertia than prior art motors, the rotor of the invention enables a motor to have much higher efficiency than has hitherto been obtainable. Whereas in prior art small motors, a maximum efficiency of about 50% has been the highest obtainable; with motors of type herein disclosed, efficiencies of 75% have not been uncommon.

The rotor as described is particularly applicable for use with small permanent-magnet motors. The larger the diameter of the rotor, the more desirable it may be to increase the length of the commutator cylinder to maintain enough inertia in the rotor to assure running stability. The rotor itself is of extremely simple construction, a feature which conrtibutes to its inexpenesive manufacture.

The invention has been described in detail with particular reference to preferred embodiments thereof, and it will be understood that variations and modifications can be effected within the scope and spirit of the invention as described hereinabove and as defined in the appended claims.

I claim:
1. A method of making an electrical winding, comprising the steps of winding onto a form a length of insulated wire in substantially tight and nonoverlapping configuration, separating the formed length of wire from said form and deforming said formed length of wire into substantially flat configuration, and joining the ends of the flattened formed length to form a cylindrical configuration.

2. A method according to claim 1 wherein the step of deforming comprises moving one side of said formed length along its length relative to the opposite side, forming a lap winding of adjacent loops.

3. A method accodring to claim 1 wherein said form is of hexagonal cross-section so that said formed length of wire comprises a plurality of adjacent hexagonal shaped loops.

4. A method according to claim 1 wherein said step of joining comprises coaligning and attaching together in overlapped configuration the end portions of said formed length of wire.

5. A rotor comprising:
(a) a rotatable shaft having an axis of rotation;
(b) insulating support means concentrically mounted with respect to said shaft and attached to said shaft;
(c) a self-supporting lapped winding attached to said support means, said winding comprising a length of wire forming a series of adjacent loops having a segment of each loop obliquely positioned to said axis of rotation of said rotatable shaft, a second segment of each loop being positioned substantially parallel to said axis of rotation, and a third segment of each loop being obliquely positioned to said axis of rotation and nonparallel with the first segment of each loop.

6. A method of making an electrical winding comprisinng the steps of:
(a) winding a length of insulated wire onto a form;
(b) separating the formed length of wire from said form; and
(c) deforming said formed length of wire into a substantially flat configuration.

7. A motor comprising:
(a) a motor frame;
(b) a rotatable shaft supported by said motor frame;
(c) rotatable insulating disc-shaped support means attached to said shaft;
(d) a rotatable self-supporting winding attached to said support means;
(e) a magnet positioned concentrically with respect to said shaft inside of said winding, said magnet being attached to said motor frame;
(f) an annular member of ferromagnetic material surrounding said winding providing a magnetic flux return path; and
(g) an annular magnet abutting the inside of said member of ferromagnetic material.

References Cited

UNITED STATES PATENTS

| | | | |
|---|---|---|---|
| 3,356,877 | 12/1967 | Burr | 310—266 |
| 3,360,668 | 12/1967 | Faulhaber | 310—195 |

WARREN E. RAY, *Primary Examiner.*

U.S. Cl. X.R.

29—598; 310—202, 266

Disclaimer 3,441,761.—*Richard Clarence Painton* and *Clarence Albert Burke*, Rochester, N.Y. IRONLESS ROTOR FOR ELECTRIC MOTOR. Patent dated Apr. 29, 1969. Disclaimer filed Dec. 7, 1971, by the assignee, *Eastman Kodak Company*.

Hereby enters this disclaimer to claims 5 and 7 of said patent.

[*Official Gazette March 7, 1972.*]